June 5, 1951  T. J. R. BRIGHT  2,555,780

WEATHER STRIP

Filed Nov. 7, 1946

Inventor
Thomas John Robert Bright
by Stevens Davis + Miller
his attorneys

Patented June 5, 1951

2,555,780

UNITED STATES PATENT OFFICE 2,555,780

WEATHER STRIP

Thomas John Robert Bright, Allesley, near Coventry, England

Application November 7, 1946, Serial No. 708,429 In Great Britain March 9, 1945, Section 1, Public Law 690, August 8, 1946 Patent expires March 9, 1965

3 Claims. (Cl. 20—69)

This invention relates to draught-excluding means for doors, windows and the like, particularly the doors of motor and other vehicles, such draught-excluding means comprising a strip of rubber, synthetic rubber or other resilient material or composition adapted for insertion between the door, window and the like and a co-operating fixed part, the strip having a shape in cross-section which was hitherto substantially flat along one marginal portion for attachment purposes, the other marginal portion being of incomplete tubular or channel section, the attachment portion being disposed substantially tangential to said incomplete tubular or channel section. Examples of such draught-excluding means form the subject of my prior British Patents Nos. 516,472, 522,025 and 548,757, of which the draught-excluding means in accordance with the present invention is virtually an improvement in or modification.

It has been proposed according to the specifications of the above-numbered prior patents to mount the draught-excluding strip on a fixed plate or flange which actually entered the mouth of the incomplete tubular or channel portion, the plate or flange forming either an integral part of the fixed door or like surround, or being constructed separately therefrom in the form of an attachment the plate or flange constituting an abutment against which the effective part of the draught-excluder was forced under the closing action of the door or the like. In some cases a trimming strip was also used which was located behind the plate or flange, the attachment portion in such cases being sandwiched between the trimming strip and the plate or flange, the draught-excluder being thus maintained in position.

The effectiveness of the draught-excluder depended to a very great extent on the correct fitting of the plate or flange, trimming strip if such were employed, and the draught-excluder strip itself; and, although in the main the draught-excluding means disclosed by the specifications of my prior patents were quite satisfactory provided they were correctly fitted, there was the possibility that faulty fitting might impair the efficiency of the device.

The chief object of the present invention is to evolve a draught-excluding strip of the kind set forth which will not only be more efficient than those hitherto proposed by virtue of its novel cross-sectional shape, but will at the same time ensure its correct location relatively to the plate or flange and its efficient operation even though the trimming strip be incorrectly placed in position.

A draught-excluding strip in accordance with the present invention includes a marginal attachment portion and two or more part-tubular or channel-shaped effective portions. Said attachment portion may either be substantially flat and arranged substantially tangential to said part-tubular or channel-shaped effective portions, or alternatively of channel or angle formation, or any other desired cross-sectional shape.

If of channel shape the channel-shaped part may serve to receive the edge of a carpet or the like, in which case it may not be strictly necessary to secure the draught-excluder to the plate or flange, the latter being for example of angle shape and screwed or otherwise secured to the floor the upstanding part of the plate or flange entering the draught-excluder and being sandwiched between the effective part of the draught-excluder and the channel-shaped part. In the case of the angle type of attachment portion, the latter may be arranged to be beneath the carpet or other floor covering, the draught-excluder being once more either adhesively or otherwise secured to the plate or flange, or being maintained in position thereon by its clip-like engagement with the upstanding part and the weight of the floor covering.

According to a further feature of the invention, the draught-excluding strip is so shaped internally as to provide a shoulder or abutment against which the edge of the metal plate or flange is adapted to abut when the draught-excluding strip and plate or flange are in their correct relative operative positions.

The part-tubular or channel-shaped configuration of the effective part of the draught-excluding strip may be either produced by moulding, extruding or otherwise forming the strip to provide two tubular parts, and then slitting the tubular parts longitudinally, or the strip may in the first case be moulded or otherwise formed to the required part-tubular or channel configuration.

The part-tubular or channel-shaped portions of which there are preferably two to each strip, are preferably of unequal diameter or width and are arranged one within the other, the two part-tubular portions being in the form of inwardly-directed extensions of the attachment portion, the arrangement being such that the free edges of the part-tubular portions are spaced from the attachment portion when the door or the like is in its open position, the effective diameter of the part-tubular portions being substantially reduced as a result of closing the door or the like thereon. It will be appreciated that the provision of a plurality of cut or otherwise formed part-tubular portions provides a double-cushion effect when the door or the like is closed, and by suitably arranging the smaller of the two part-tubular portions relatively to the attachment portion, the former may in itself constitute an abutment for the edge of the metal or other rigid plate or flange. The plate or flange forms a positive face for the draught-excluder to compress against, the attachment portion of the draught-excluder being secured to the rear face of the plate or flange by any suitable means, such as for example by a suitable adhesive, or by a clip or other fastening of appropriate form. By employing the rigid plate or flange, and by providing the draught-excluder strip with a shoulder or other part against which the edge of the plate or flange can abut, the draught-excluder can be positively located in its correct operative position, in which case the position of the trimming strip will be immaterial, the trimming strip being dispensed with if desired.

The provision of the smaller part-tubular portion imparts increased strength to the strip where it is most required and enables the thickness of the material to be decreased, thus making the strip more flexible as a whole.

The metal plate or flange may be in the form of a simple straight or angle strip which can be screwed or otherwise attached to the door or other surround, or it may form an integral part of the door or other surround. In the former case it is preferred from the point of view of ensuring effectiveness of the draught-excluding device, should the door or the like or its co-operating part be deformed, that the edge of the plate or flange which is adapted to receive the draught-excluding strip shall be slit or cut at a plurality of spaced points so that the plate or flange can easily be bent, either locally or along its entire length towards or away from the door, or the like, to ensure the plate or flange conforming to any variations in the shape of the door or the like with the object of taking up any discrepancy and ensuring the draught-excluding strip being compressed a uniform amount throughout its length. If the opening for the door or the like is curved, slits or cuts may be formed in the plate or flange on either one or both sides to facilitate the plate or flange being bent to take up the desired contour, this being distinct from bending the plate or flange backwards or forwards to take up any discrepancy between the door or the like and the surrounding opening. Furthermore, the plate or flange may be provided with slot-like holes for the reception of securing screws, the slot-like holes permitting a certain amount of adjustment to ensure that the draught-excluding strip operates in its most efficient manner.

In order that the invention may be clearly understood and readily carried into effect the invention is hereinafter described with reference to the accompanying drawings in which—

Figure 1:
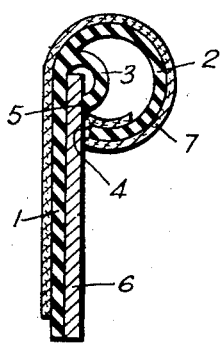
Figure 1 is a section of a draught-excluder strip in accordance with the invention mounted in position on a plate or flange.

Referring in the first case to Figure 1 the draught excluding strip includes a substantially flat marginal attachment portion 1 and a part tubular or channel shaped effective portion comprising an outer part 2 and an inner part 3 both parts being of part circular formation, the edges 4 and 5 making contact with a fixed metal or other comparatively rigid plate or flange 6, the inner part 3 by virtue of its positioning and internal shape limiting the entry of the plate or flange and thus ensuring accurate location of the strip thereon. The strip may be provided with an external covering material 7 which may be secured in position by adhesion and may be in the form of a layer of fabric. Alternatively the covering material may be applied by a flock spraying or similar process. In any case it is preferred that the covering material shall extend around the free edge of the outerpart into the interior thereof.

Figure 2:
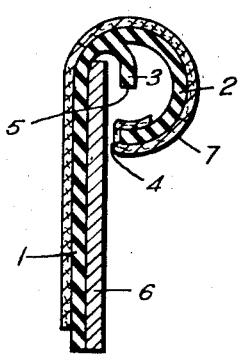
Figure 2 is a section of a modified form.

Referring now to Figure 2 which shows a slightly modified form and wherein similar reference numerals are employed to designate similar parts the inner part 3 is of a more or less channel shaped formation and is so arranged that the plate or flange enters the strip to a greater extent than is the case in Figure 1, the edges 4 and 5 moreover lying out of contact with the plate or flange when the latter is in its operative position.

Figure 3:
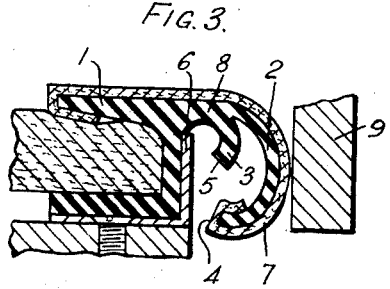
Figures 3 and 4 illustrate in section two further alternative constructions.
Figure 4:
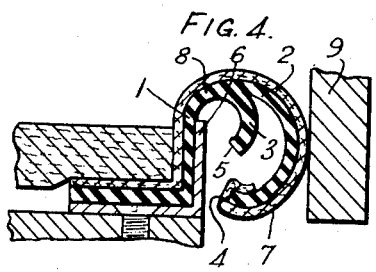

In the case of Figures 3 and 4 which show two constructions intended for use in conjunction with a carpet or other floor covering the attachment portion in this case is of channel or angle shape, the plate or flange in both cases being of angle section and screwed or otherwise secured to the floor. In Figure 3 the carpet actually enters the channel shaped attachment part but in Figure 4 merely fits into the angle formed by the attachment portion. The formation of the inner and outer parts 2 and 3 is somewhat different to Figures 1 and 2 the parts being connected with the attachment portion by a neck portion 8.

The door is diagrammatically indicated by reference numeral 9, the action of closing the door (the latter being shown not fully closed) resulting in the edges 4 and 5 of the inner and outer parts being brought into contact with the metal plate or flange as in the case of Figures 1 and 2, the effective part being partly compressed to provide a good sealing effect.

What I claim is:

1. A narrow draught excluding strip of resilient material comprising an elongated flat portion and an integral portion extending from a long edge of the flat portion, said integral portion being curved back toward the flat portion and defining with said flat portion a tubular portion having a narrow open slit adjacent one side of the flat portion and a second portion also integral with the curved portion, said second portion defining within the tubular portion a channel having its mouth registering with the slit whereby the edge of a supporting flange may be passed through the slit and received in the channel.

2. A narrow draught excluding strip of resilient material comprising an elongated flat portion and an integral portion extending from a long edge of the flat portion, said integral portion being curved back toward the flat portion and defining with said flat portion a tubular portion having a narrow open slit adjacent one side of the flat portion and a second portion integral with the curved portion and also curving back toward the flat portion, said second portion lying within the interior of said tubular effective portion to define a channel registering with said slit and functioning to receive the edge of a supporting flange.

3. A narrow draught excluding strip as claimed in claim 1 further comprising a second elongated, integral flat portion extending at an angle from that long edge of the first-mentioned flat portion which lies opposite to the edge from which the tubular portion extends.

THOMAS JOHN ROBERT BRIGHT.

REFERENCES CITED

The following references are of record in the file of this patent:

FOREIGN PATENTS

| Number | Country | Date |
|---|---|---|
| 794,152 | France | Dec. 2, 1935 |
| 516,472 | Great Britain | Jan. 3, 1940 |